(12) United States Patent
Blundell et al.

(10) Patent No.: US 8,572,341 B2
(45) Date of Patent: Oct. 29, 2013

(54) OVERFLOW HANDLING OF SPECULATIVE STORE BUFFERS

(75) Inventors: Colin B. Blundell, West Allenhurst, NJ (US); Harold Wade Cain, III, Yorktown Heights, NY (US); Gheorghe C. Cascaval, Carmel, NY (US); Maged Milad Michael, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 12/559,615

(22) Filed: Sep. 15, 2009

(65) Prior Publication Data

US 2011/0066820 A1 Mar. 17, 2011

(51) Int. Cl.
*G06F 12/00* (2006.01)
(52) U.S. Cl.
USPC ........................................ 711/163; 711/E12.1
(58) Field of Classification Search
USPC .......................................................... 711/163
See application file for complete search history.

(56) References Cited

U.S. PATENT DOCUMENTS

| | | | | |
|---|---|---|---|---|
| 5,745,915 A * | 4/1998 | Cooper et al. | ................. | 711/114 |
| 7,149,851 B1 * | 12/2006 | Rozas et al. | ................... | 711/141 |
| 2004/0078508 A1 * | 4/2004 | Rivard | ............................... | 711/4 |
| 2004/0079877 A1 * | 4/2004 | Hidalgo et al. | ............... | 250/287 |
| 2005/0251660 A1 * | 11/2005 | Bell et al. | ...................... | 712/225 |

* cited by examiner

*Primary Examiner* — Reginald Bragdon
*Assistant Examiner* — Aracelis Ruiz
(74) *Attorney, Agent, or Firm* — Yudell Isidore Ng Russell PLLC (57) ABSTRACT

A method, a system and a computer program product for handling speculative stores. The system determines when a speculative store buffer is not full. An indicator is generated when the speculative store buffer is not full, and the speculative stores are input into the speculative store buffer. When the speculative store buffer is full, a full buffer indicator is generated. Speculative stores prevented from entering the speculative store buffer are overflow stores. The overflow list is searched to determine whether one or more addresses of the overflow stores are present in the overflow list. When one or more addresses of the overflow stores are not present in the overflow list, the overflow stores are stored in the overflow list.

19 Claims, 6 Drawing Sheets

OVERFLOW HANDLING OF SPECULATIVE STORE BUFFERS

BACKGROUND

1. Technical Field

The present invention generally relates to microprocessors and in particular to speculative store buffers within microprocessors.

2. Description of the Related Art

A speculative store buffer is speculatively updated in response to speculative store memory operations buffered by a load/store unit in a microprocessor. Instead of performing dependency checking for load memory operations among the store memory operations buffered by the load/store unit, the load/store unit may perform a lookup in the speculative store buffer. The speculative store buffer holds values tentatively, allowing loads by the same hardware thread to read speculative values. Currently, the number of entries accepted into the speculative store buffers is limited. When the size limit of a speculative store buffer is attained, the speculative store buffer is no longer utilized, forcing the program utilizing the speculative store buffer to employ a different path of execution.

The size of buffers (such as reservation stations and the load/store buffer for storing memory operand requests or memory operations) may be increased to offset the delay in fetching memory operands. With increased buffer sizes, the capability of the microprocessor to detect parallelism in instruction code being executed is increased. Unfortunately, increased buffer size poses problems in program execution. Particularly, the load/store buffer performs dependency checking upon memory accesses to the data cache, to ensure that a prior store memory operation within the buffer is not bypassed by a subsequent load memory operation. As the number of buffer entries increases, the execution logic becomes more complex and requires increased evaluation time.

SUMMARY OF ILLUSTRATIVE EMBODIMENTS

Disclosed are a method, a system and a computer program product for storing a speculative store buffer to a full capacity and maintaining an overflow list of speculative stores when the full capacity of the speculative store buffer prevents one or more speculative stores from entering the speculative store buffer. The system determines when a speculative store buffer is one of available and full. An indicator is generated when the speculative store buffer is available, and the speculative stores are input into the speculative store buffer. When the speculative store buffer is full, a full buffer indicator is generated. A speculative store prevented from loading into the speculative store buffer is an overflow store. The overflow store is compared to speculative stores in an overflow list. The overflow list of speculative stores is searched to determine whether the address of the overflow store is present in the overflow list. When the address of the overflow store is not present in the overflow list, the overflow store is stored in the overflow list.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, a system and a computer program product for storing a speculative store buffer to a full capacity and maintaining an overflow list of speculative stores when the full capacity of the speculative store buffer prevents one or more speculative stores from entering the speculative store buffer. The system determines when a speculative store buffer is one of available and full. An indicator is generated when the speculative store buffer is available, and the speculative stores are input into the speculative store buffer. When the speculative store buffer is full, a full buffer indicator is generated. A speculative store prevented from loading into the speculative store buffer is an overflow store. The overflow store is compared to speculative stores in an overflow list. The overflow list of speculative stores is searched to determine whether the address of the overflow store is present in the overflow list. When the address of the overflow store is not present in the overflow list, the overflow store is stored in the overflow list.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
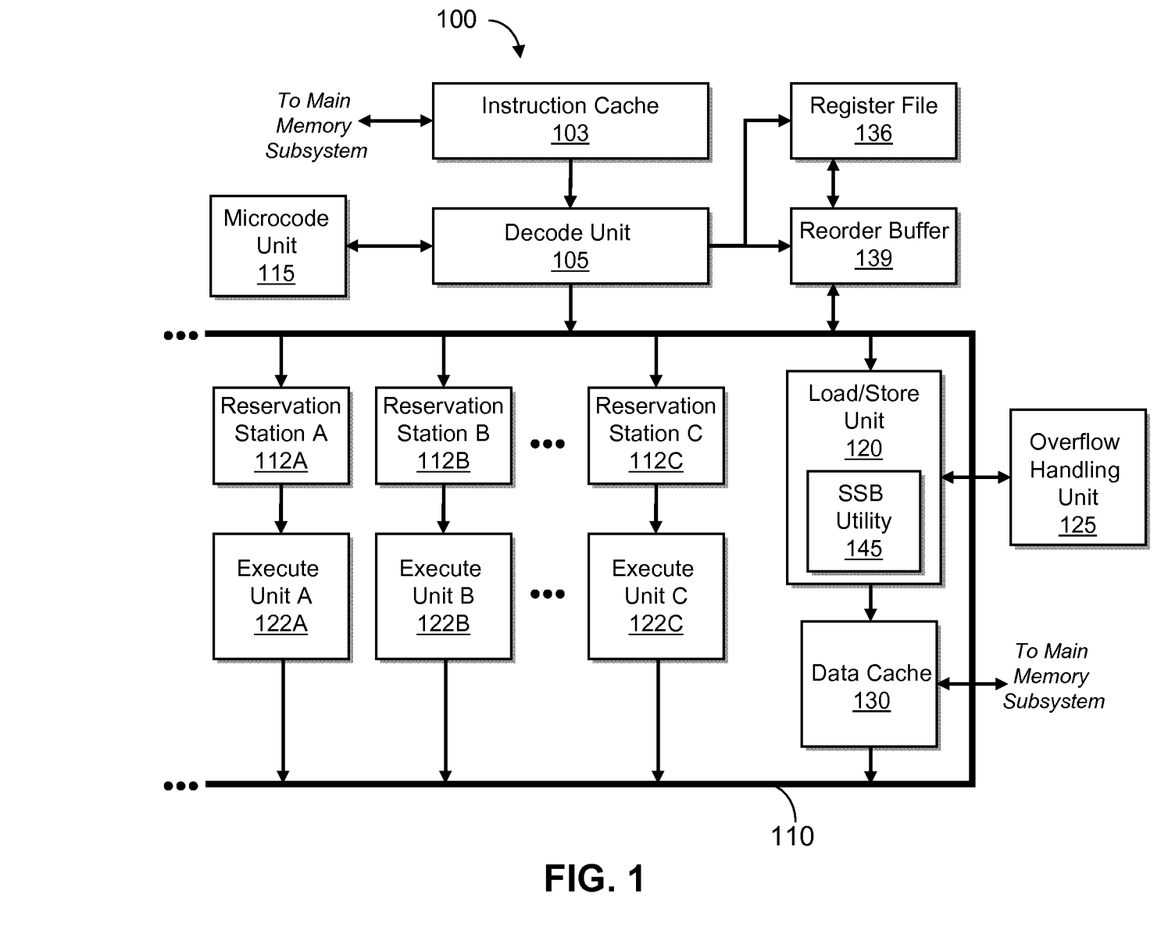
FIG. 1 provides a block diagram representation of a microprocessor within which the invention is practiced, according to one embodiment of the invention.

With reference now to the figures, and beginning with FIG. 1, there is depicted a block diagram representation of an example microprocessor, as utilized within one embodiment. Microprocessor 100 includes instruction cache 103, data cache 130, decode unit 105, one or more reservation stations 112 A, 112 B, and 112 C, one or more execute units 112 A, 112 B, and 112 C, load/store unit 120, reorder buffer 139, register file 136, and microcode unit 115. Signals and instruction are transmitted within microprocessor 100 via system bus 110. Microprocessor 100 also includes overflow handling unit 125. Overflow handling unit 125 communicates with load/store unit 120. Elements referred to herein with a particular reference number followed by a letter will be collectively referred to by the reference number alone. For example, the plurality of execute units will be collectively referred to herein as execute units 122.

In one embodiment, load/store unit 120 includes a load/store buffer for storing memory operations corresponding to instructions. Memory operations are dispatched by decode unit 105 into the load/store buffer. When the load store buffer receives the memory operations, the address operands become available, and the address of the memory operation is generated. Execute units 122 generate the address and forward the address to load/store unit 120. In another embodiment, load/store unit 120 may be configured to generate the address.

In one embodiment, instruction cache 103 is a high speed cache memory for storing instructions. Instructions are fetched from instruction cache 103 and conveyed to decode unit 105 for decode and dispatch to one or more reservation stations 112 (A-C). Decode unit 105 decodes each instruction fetched from instruction cache 103. Decode unit 105 dispatches the instruction to one or more of reservation stations 112 and/or load/store unit 120 depending upon the type of instruction detected. Instruction and memory operations are transmitted by bus 110.

In one embodiment, load/store unit 120 provides an interface between execute units 122 and data cache 130. Load and store memory operations are performed by load/store unit 120 and transmitted to data cache 130. A load memory operation specifies the transfer of data from one or more memory locations within the main memory to microprocessor 100.

In one embodiment, load/store unit 120 further includes a speculative store buffer. The speculative store buffer is configured to store a speculative state of one or more memory locations. The speculative store buffer of load/store unit 120 communicates with overflow handling unit 125. Overflow handling unit 125 is a software/firmware component that maintains an overflow list of speculative stores.

Speculative store buffer (SSB) utility 145 executes on microprocessor 100 to provide SSB logic. In actual implementation, SSB utility 145 may be combined with or incorporated within microcode of load/store unit 120 to provide a single executable component, collectively providing the various functions of each individual component when the corresponding combined code is executed by microprocessor 100. For simplicity, SSB utility 145 is illustrated and described as a stand alone or separate software/firmware component, which provides specific functions, as described below.

Microprocessor 100 executes SSB utility 145. Certain functions supported and/or implemented by SSB utility generate processing logic executed by processor and/or device hardware to complete the implementation of that function. For simplicity of the description, the collective body of code that enables these various features is referred to herein as SSB utility 145. Among the software/firmware code/instructions/logic provided by SSB utility 145, and which are specific to the invention, are: (a) code/logic for determining when a speculative store buffer is available and when the speculative store buffer is full; (b) code/logic for dynamically generating one of a failed indicator and a success indicator; and (c) code/logic for storing one or more overflow speculative stores in the overflow list of speculative stores. According to the illustrative embodiment, when microprocessor 100 executes SSB utility 145, a series of functional processes are initiated that enable the above functional features as well as additional features/functionality. These features/functionality are described in greater detail below within the description of FIGS. 2-6.

Those of ordinary skill in the art will appreciate that the components and basic configuration depicted in FIG. 1 may vary. The illustrative components within microprocessor 100 are not intended to be exhaustive, but rather are representative to highlight essential components that are utilized to implement the present invention. For example, other devices/components may be used in addition to or in place of the components depicted. The depicted example is not meant to imply architectural or other limitations with respect to the presently described embodiments and/or the general invention.

Figure 2:
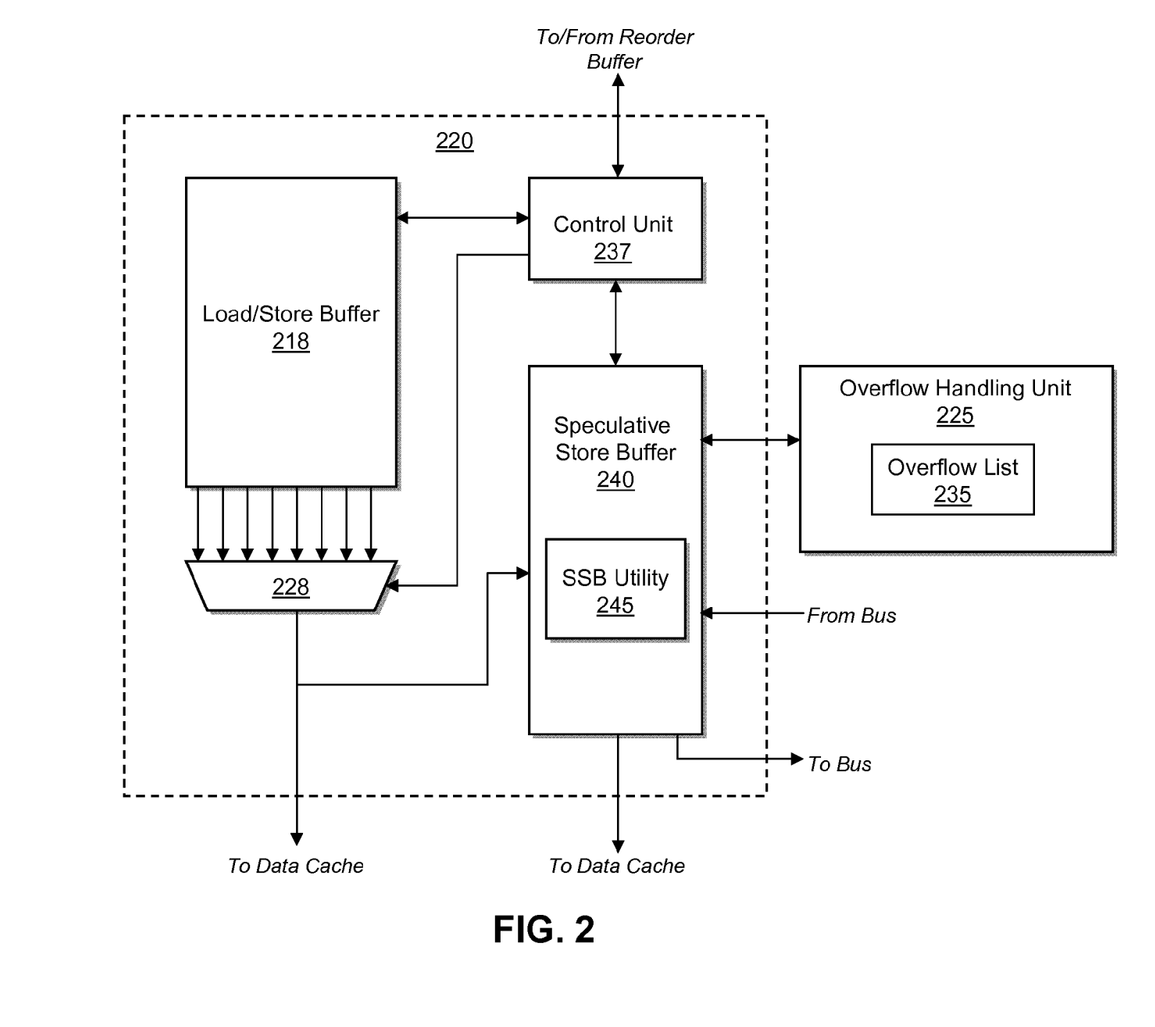
FIG. 2 is a diagram illustrating a load/store unit associated with an overflow handling unit, in accordance with one embodiment of the invention.

With reference now to FIG. 2, there is illustrated a load/store unit associated with an overflow handling unit. Load/store unit 220 includes load store buffer 218, multiplexor 228, control unit 237, and speculative buffer 240. Within speculative store buffer 240 is SSB utility 245. Overflow handling unit 225 includes overflow list of speculative stores 235.

In one embodiment, a speculative store is received at a speculative store buffer. The speculative store entry contains an address and a value. SBB utility 245 detects the current status of speculative store buffer 240. SBB utility 245 searches speculative store buffer 240 for an identical address, previously added to speculative store buffer 240. When an identical address is detected within speculative store buffer 240, the value of the identical address is returned to a register, such as register file 136 (FIG. 1). The value corresponds to a memory operation identified by the address of the speculative store.

In one embodiment, one or more entries of the speculative store buffer (240) are available. Speculative store buffer 240 receives one or more speculative stores. SBB utility 240 determines the address of the current speculative store does not exist in speculative store buffer 240. The address and the value of the current speculative store are stored in the empty address and value space of speculative store buffer 240.

In one embodiment, the speculative store buffer (240) is full, and no further speculative stores may be added. One or more speculative stores are received at the speculative store buffer. SBB utility 245 determines the address is not previously stored within speculative store buffer 240. The one or more speculative stores that do not fit into the speculative store buffer are overflow speculative stores. Overflow list of speculative stores 235 is serially searched to determine whether an address of the one or more overflow speculative stores is identical to an address of a store within overflow list of speculative stores 235. When a matching address is detected, the value of the address is returned an associated register and/or application. If a matching address is not detected, the one or more overflow speculative stores are input into the overflow list of speculative stores.

In another embodiment, speculative store buffer 240 is partially occupied. Speculative store buffer 240 receives a number of speculative stores; however, one or more speculative stores are not able to fit within the speculative store buffer. For example, speculative store buffer 240 holds a total of thirty six entries. Thirty two entries are occupied (contain speculative stores), leaving four empty entries. Six speculative store entries are received at speculative store buffer 240. Four speculative stores are stored with speculative buffer 240, and two speculative stores remain as overflow speculative stores. The remaining overflow speculative stores are received by overflow list of speculative stores 235. Overflow list of speculative stores 235 searches for matching addresses and/or stores the remaining overflow speculative stores.

Figure 3:
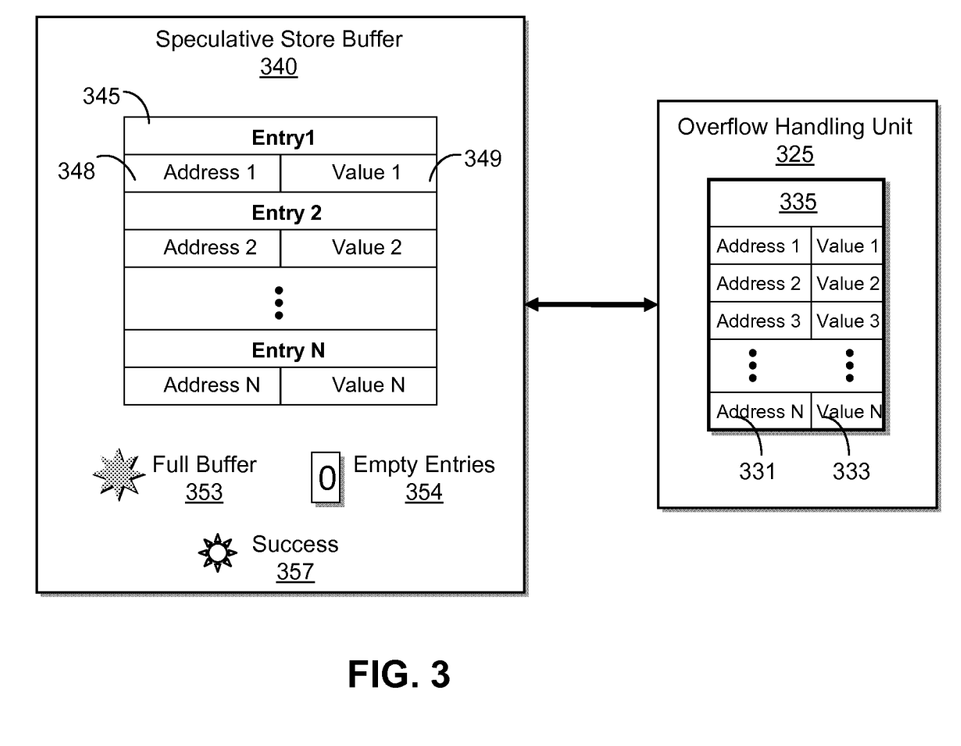
FIG. 3 is a diagram illustrating a speculative store buffer associated with an overflow handling unit, according to one embodiment of the invention.

FIG. 3 illustrates a speculative store buffer associated with an overflow handling unit. Speculative store buffer 340 comprises speculative store buffer entry 345, full buffer indicator 353, empty entries indicator 354, and success indicator 357. Within speculative store buffer entry 345 are speculative store buffer address space 348, and speculative store buffer value space 349. Overflow handling unit 325 includes overflow list of speculative stores 335. Overflow list of speculative stores 335 contains one or more address and value spaces, or overflow address space 331 and overflow address space 333.

In one embodiment, a speculative store is received at a full speculative store buffer. When the speculative store is received at speculative buffer 340, SBB utility detects that there is no available store buffer entry 345. SBB utility detects whether the address of the speculative store is in the speculative store buffer. When the address is not detected in the speculative store buffer, and the buffer is full, a first indicator is generated to indicate the buffer is full and/or the speculative store has failed to be added to speculative store buffer 340. The indicator and/or signal generated enables full buffer indicator 353.

In one embodiment, the speculative store is detected at the overflow handling unit. SBB utility detects whether the address of the speculative store previously exist within overflow list of speculative stores 335. Overflow list of speculative stores 335 is a hash table or bloom filter that holds (stores) one or more previous overflow stores. The address and value of the overflow speculative store entry is saved within overflow list of speculative stores 335. However, if the current overflow address is identical to a previously stored overflow speculative store address (within the overflow list of speculative stores 335), the value of the overflow speculative store is updated and/or returned to a register.

In one embodiment, one or more speculative store entries of speculative store buffer 340 are available. Speculative store buffer entry 345 contains speculative store buffer address space 348 and speculative store buffer value space 349. Empty entries indicator 354 displays the number of available speculative store entries when the number of speculative stores is generated by the SSB utility. When a speculative store is accepted by speculative store buffer 340, a second indicator or success indicator 357 is enabled. Empty entries indicator 354 is associated with the one or more store buffer entries (345). Empty entries indicator 354 dynamically adjusts to reflect the number of available store buffer entries.

Figure 4:
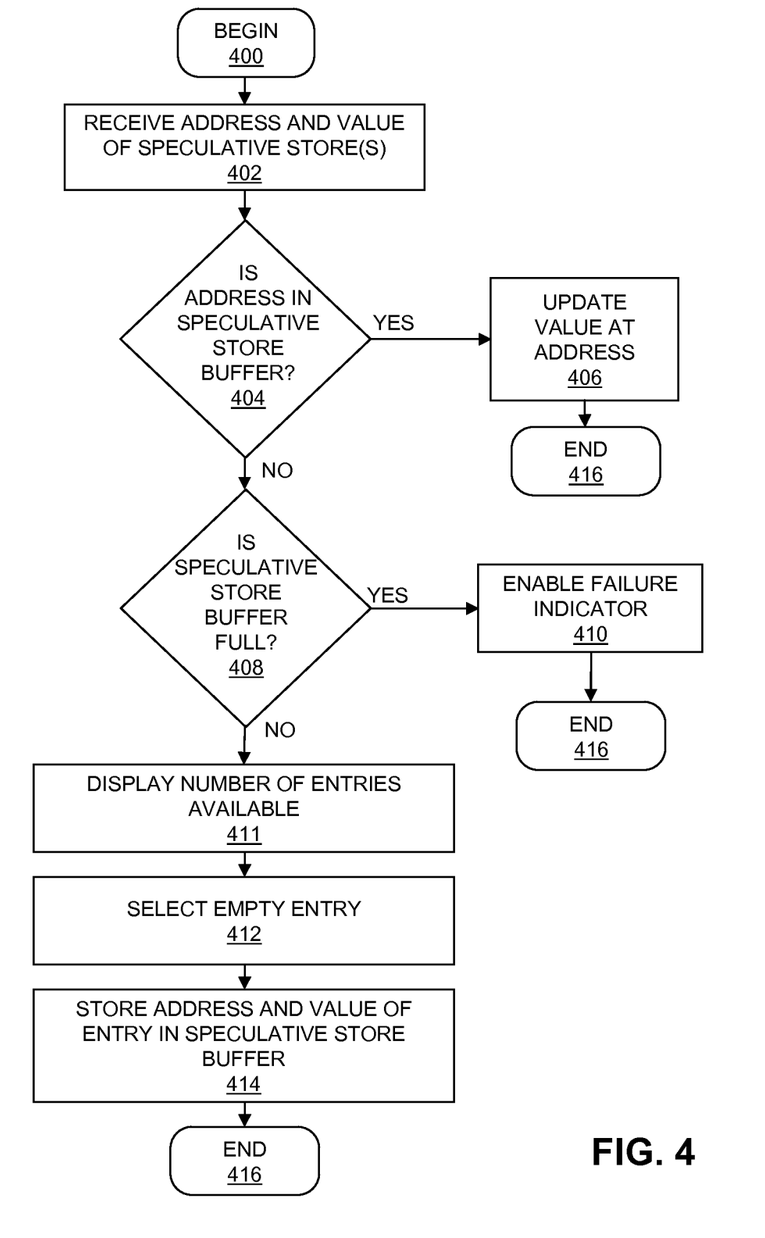
FIG. 4 is a flow chart illustrating the processes for transmitting a speculative store to an overflow list for software transactional memory (STM) handling of writes, in accordance with one embodiment of the invention.
Figure 5:
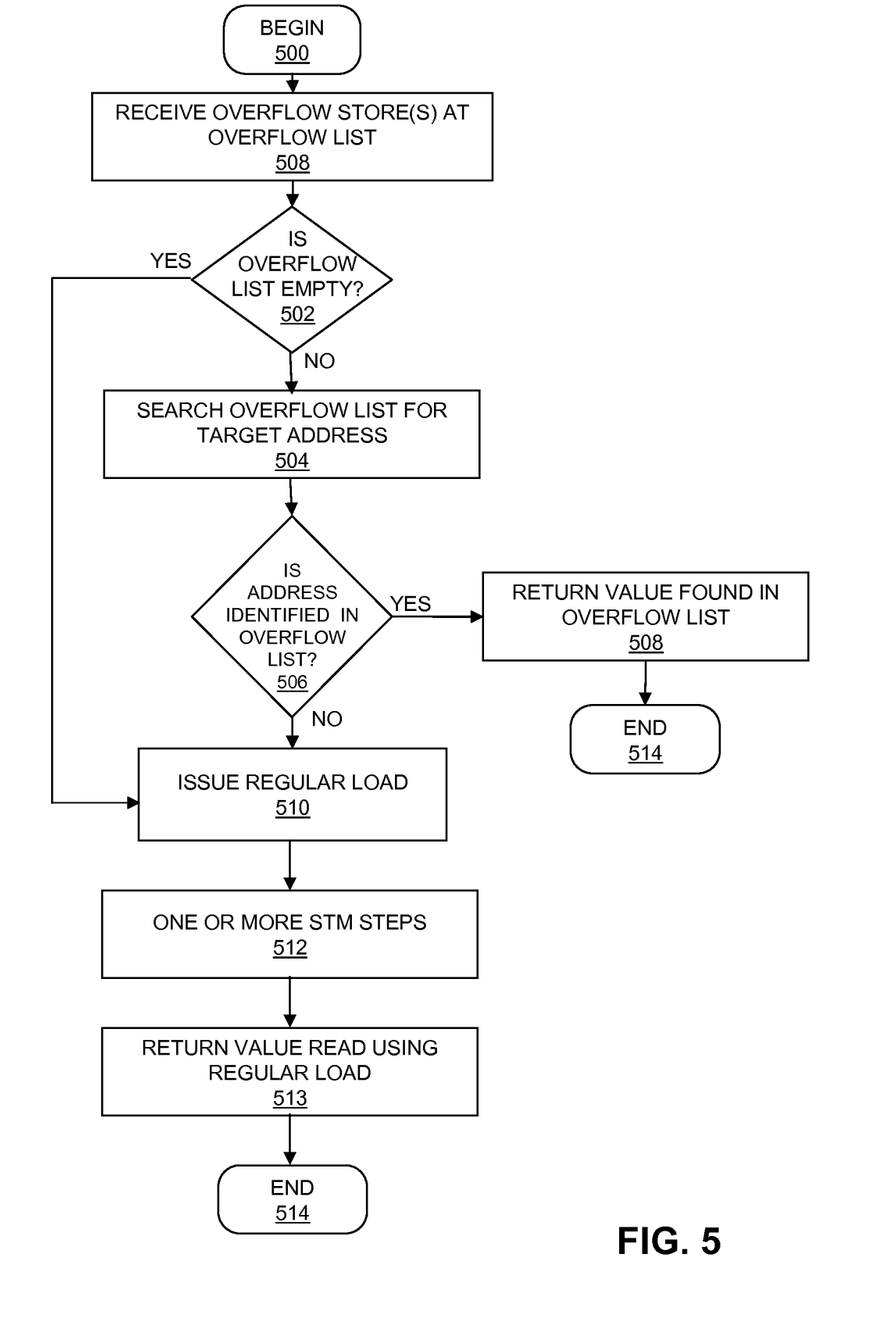
FIG. 5 is a flow chart illustrating the processes for assigning a speculative store to an overflow list for STM read handling, according to one embodiment of the invention.
Figure 6:
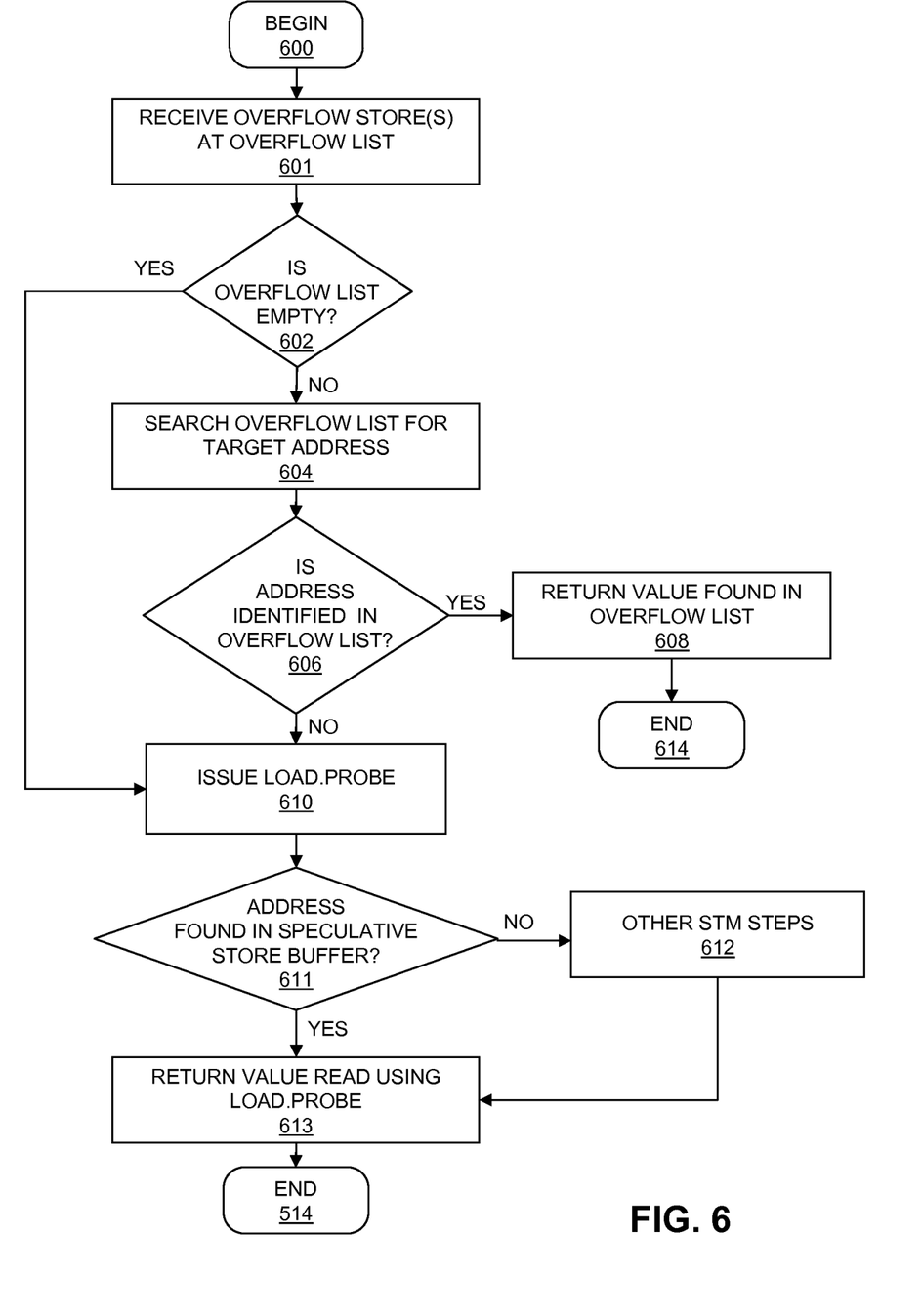
FIG. 6 is a flow chart illustrating the processes for STM read handling to bypass unnecessary processing steps when assigning a speculative store to an overflow list, according to one embodiment of the invention.

FIGS. 4-6 are flow charts illustrating various methods by which the above processes of the illustrative embodiments are completed. Although the methods illustrated in FIGS. 4-6 may be described with reference to components shown in FIGS. 1-3, it should be understood that this is merely for convenience and alternative components and/or configurations thereof can be employed when implementing the various methods. Key portions of the methods may be completed by SSB utility 245 executing within speculative store buffer 240 of load/store unit 220 (FIG. 2) and controlling specific operations of speculative store buffer 240, and the methods are thus described from the perspective of both SSB utility 245 and speculative store buffer 240.

FIG. 4 depicts the processes for transmitting a speculative store to an overflow list for software transactional memory (STM) handling of writes. The process of FIG. 4 begins at initiator block 400 and proceeds to block 402, at which an address and value of a speculative store is received. A decision is made, at block 404, whether the address of the speculative store is detected within the speculative store buffer. If the address is detected within the speculative store buffer (as a previously stored address), the value at the address is updated, at block 406. If the address is not detected at the speculative store buffer, the process continues to block 408. A decision is made, at block 408, whether the speculative store buffer is full. If the speculative store buffer is full, the failure (or full buffer) indicator is enabled at block 410. If the speculative buffer is not full, a number of available entries are displayed at block 411. The available (empty) entry is selected at block 412. At block 414 the address and value of the entry is stored within the speculative store buffer. The process ends at block 416.

The process of FIG. 5 depicts the processes for assigning a speculative store to an overflow list for STM read handling. The process of FIG. 5 begins at initiator block 500 and proceeds to block 501. At block 501 one or more overflow stores are received at an overflow list. A determination is made, at block 502, whether the overflow list is empty. If the overflow list is empty, the process continues to block 510. If the overflow list is not empty the process continues to block 504. At block 504, the overflow list is searched for an address (previously stored overflow address) identical to that of the overflow store(s).

A determination is made, at block 506, whether the address of overflow store(s) is identified in the overflow list. If the address is previously stored in the overflow list (and identified by the utility) the process continues to block 508. At block 508 the value of the address is updated (returned to a register and/or associated application). If the address is not in the overflow list, the process continues to block 510. At block 510 the process issues a load instruction of the target address. At block 512 the process executes one or more other STM read steps. At block 513 the process returns the value read using the load instruction (issued in block 510). The process ends at block 514.

FIG. 6 depicts the process for STM read handling to bypass unnecessary processing steps. The process of FIG. 6 begins at initiator block 600 and proceeds to block 601. At block 601 one or more overflow stores are received at an overflow list. A determination is made, at block 602, whether the overflow list is empty. If the overflow list is empty, the process continues to block 610. If the overflow list is not empty, at block 604, the overflow list is searched for an address (previously stored overflow address) identical to that of the overflow store(s).

A determination is made, at block 606, whether the address of the overflow store(s) is identified in the overflow list. If the address is previously stored in the overflow list (and identified by the utility) the process continues to block 608. At block 608 the value of the address is updated (returned to a register and/or associated application). If the address is not in the overflow list, the process continues to block 610. At block 610 the process issues a load.probe instruction of the target address. A determination is made, at block 611, whether the target address (utilized in load.probe instruction) was found in the speculative store buffer. If the address was not found the process continues to block 612. At block 612 the process executes one or more other STM read steps. If the address is found in the speculative store buffer the process continues to block 613. At block 613 the process returns the value read using the load.probe instruction (issued at block 610). The process ends at block 614.

In the flow charts above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a processor having a speculative store buffer a method for handling speculative stores, said method comprising:

processor logic determining when the speculative store buffer is not at full capacity;

storing one or more speculative stores in the speculative store buffer in response to the speculative store buffer not being at full capacity;

dynamically generating a full capacity indicator in response to the speculative store buffer being loaded to full capacity;

responsive to a subsequent receipt of one or more overflow speculative stores when the speculative store buffer is at full capacity, storing the one or more of the overflow speculative stores in an overflow list of overflow speculative stores;

associating the speculative store buffer with the overflow list of overflow speculative stores, wherein the overflow list of overflow speculative stores holds one or more previous overflow stores;

generating the overflow list of overflow speculative stores, wherein one or more overflow speculative stores are loaded into the overflow list of overflow speculative stores;

determining when the overflow list of overflow speculative stores is empty; and in response to the overflow list of overflow speculative stores not being empty, searching the overflow list of overflow speculative stores for a previously stored overflow address that is identical to an address of the one or more overflow speculative stores.

2. The method of claim 1, further comprising:

in response to a speculative store being loaded into the speculative store buffer, generating a success indicator;

generating a number of empty speculative store buffer entries in response to the speculative store buffer being available; and dynamically adjusting the number of empty speculative store buffer entries generated in response to at least one of an increase and a decrease in a count of speculative stores within the speculative store buffer.

3. The method of claim 1, further comprising:

dynamically comparing a speculative store address of the one or more overflow speculative stores to one or more previously stored overflow address in the overflow list of speculative stores, wherein the overflow list of overflow speculative stores is serially searched.

4. The method of claim 3, further comprising in response to the speculative store address not being identical to a previously stored overflow address within the overflow list of speculative stores, issuing a load instruction of the speculative store address.

5. The method of claim 4, further comprising issuing a load.probe instruction in response to the speculative store address not being identical to the previously stored overflow address within the overflow list of speculative stores.

6. The method of claim 3, further comprising in response to the speculative store address being identical to the previously stored overflow address within the overflow list of speculative stores, returning a value to a register, wherein the value corresponds to a memory operation identified by the speculative store address.

7. The method of claim 1, further comprising:
in response to a number of empty speculative store buffer entries being greater than the number of speculative stores received, loading all speculative stores into the speculative store buffer.

8. The method of claim 1, further comprising in response to the speculative store buffer being full, storing the overflow speculative stores in the overflow list of speculative stores.

9. A computer system for handling speculative stores, said computer system comprising:
a processor component; and
logic associated with the processor component that configures the computer system to:
determine when a speculative store buffer is not at full capacity;
store one or more speculative stores in the speculative store buffer in response to the speculative store buffer not being at full capacity;
dynamically generate a first indicator in response to the speculative store buffer being loaded to full capacity, wherein the first indicator is a full capacity indicator;
responsive to a subsequent receipt of one or more overflow speculative stores when the speculative store buffer is at full capacity, dynamically compare a speculative store address of the one or more overflow stores to one or more previously stored overflow address in the overflow list of speculative stores and store the one or more of the overflow speculative stores in an overflow list of overflow speculative store.

10. The computer system of claim 9, further comprising logic that configures the computer system to:
in response to a speculative store being loaded into the speculative store buffer, generate a success indicator;
generate a number of empty speculative store buffer entries in response to the speculative store buffer being available; and
dynamically adjust the number of empty speculative store buffer entries generated in response to at least one of an increase and a decrease of a count of speculative stores within the speculative store buffer.

11. The computer system of claim 9, wherein the overflow list of overflow speculative stores is serially searched.

12. The computer system of claim 11, further comprises logic that causes the computer system to, in response to the speculative store address not being identical to a previously stored overflow address within the overflow list of speculative stores, issue a load instruction of the speculative store address.

13. The computer system of claim 12, further comprises logic that causes the computer system to issue a load.probe instruction in response to the speculative store address not being identical to the previously stored overflow address within the overflow list of speculative stores.

14. The computer system of claim 11, further comprises logic that causes the computer system to, in response to the speculative store address being identical to the previously stored overflow address within the overflow list of speculative stores, returning a value to a register, wherein the value corresponds to a memory operation identified by the speculative store address.

15. The computer system of claim 9, further comprising logic that configures the computer system to:
in response to a number of empty speculative store buffer entries being greater than the number of speculative stores received, loading all speculative stores into the speculative store buffer.

16. A computer program product comprising:
a non-transitory computer readable storage device; and
program code on the non-transitory computer readable storage device that when executed by a processor provides the functions of:
determining when a speculative store buffer is not at full capacity;
storing one or more speculative stores in the speculative store buffer in response to the speculative store buffer not being at full capacity;
dynamically generating a first indicator in response to the speculative store buffer being loaded to full capacity, wherein the first indicator is a full capacity indicator;
responsive to a subsequent receipt of one or more overflow speculative stores when the speculative store buffer is at full capacity, storing the one or more of the overflow speculative stores in an overflow list of overflow speculative stores;
associating the speculative store buffer with the overflow list of overflow speculative stores wherein the overflow list of overflow speculative stores holds one or more previous overflow stores;
generating the overflow list of overflow speculative stores, wherein one or more overflow speculative stores are loaded into the overflow list of overflow speculative stores;
determining when the overflow list of overflow speculative stores is empty; and
in response to the overflow list of overflow speculative stores not being empty, searching the overflow list of overflow speculative stores for a previously stored overflow address that is identical to an address of the one or more overflow speculative stores.

17. The computer program product of claim 16, further comprising program code for:
in response to a speculative store being loaded into the speculative store buffer, generating a success indicator;
generating a number of empty speculative store buffer entries in response to the speculative store buffer being available;
dynamically adjusting the number of empty speculative store buffer entries generated in response to at least one of an increase and a decrease in a count of speculative stores within the speculative store buffer;
in response to the number of empty speculative store buffer entries being greater than the number of speculative stores received, loading all speculative stores into the speculative store buffer; and
dynamically comparing a speculative store address of the one or more overflow speculative stores to one or more previously stored overflow address in the overflow list of speculative stores in response to the overflow list of overflow speculative stores being searched.

18. The computer program product of claim 17, further comprising program code for:
- in response to the speculative store buffer being full, storing the overflow speculative stores in the overflow list of speculative stores;
- in response to a speculative store address not being identical to a previously stored overflow address within the overflow list of speculative stores, issuing a load instruction of the speculative store address; and
- in response to the speculative store address being identical to the previously stored overflow address within the overflow list of speculative stores, returning a value to a register, wherein the value corresponds to a memory operation identified by the speculative store address.

19. The computer program product of claim 17, further comprising program code for:
- issuing a load.probe instruction in response to the speculative store address not being identical to the previously stored overflow address within the overflow list of speculative stores.

\* \* \* \* \*